US012688585B2

(12) United States Patent
Wang et al.

(10) Patent No.: US 12,688,585 B2
(45) Date of Patent: Jul. 21, 2026

(54) CONCAVITY-BASED GROUPING FOR UNORGANIZED 3D POINT CLOUD SEGMENTATION AND ABSTRACTION

(71) Applicants: INTERDIGITAL VC HOLDINGS, INC., Wilmington, DE (US); NEW YORK UNIVERSITY, New York, NY (US)

(72) Inventors: Ruoyu Wang, New York, NY (US); Chen Feng, Scotch Plains, NJ (US); Dong Tian, Boxborough, MA (US)

(73) Assignees: INTERDIGITAL VC HOLDINGS, INC., Wilmington, DE (US); NEW YORK UNIVERSITY, New York, NY (US)

( * ) Notice: Subject to any disclaimer, the term of this patent is extended or adjusted under 35 U.S.C. 154(b) by 252 days.

(21) Appl. No.: 18/709,290

(22) PCT Filed: Nov. 11, 2022

(86) PCT No.: PCT/US2022/049655
§ 371 (c)(1),
(2) Date: May 10, 2024

(87) PCT Pub. No.: WO2023/086538
PCT Pub. Date: May 19, 2023

(65) Prior Publication Data
US 2025/0005764 A1 Jan. 2, 2025

Related U.S. Application Data

(60) Provisional application No. 63/278,527, filed on Nov. 12, 2021.

(51) Int. Cl.
*G06T 7/12* (2017.01)
*G06T 3/40* (2024.01)
(Continued)

(52) U.S. Cl.
CPC .................. *G06T 7/12* (2017.01); *G06T 3/40* (2013.01); *G06T 7/187* (2017.01); *G06T 7/64* (2017.01);
(Continued)

(58) Field of Classification Search
CPC .. G06T 7/12; G06T 7/187; G06T 7/64; G06T 3/40; G06T 2207/10028;
(Continued)

(56) References Cited

U.S. PATENT DOCUMENTS

2009/0122378 A1* 5/2009 Tomioka .............. G02B 26/125
359/205.1
2010/0145961 A1* 6/2010 Hu ........................ G06F 16/355
707/758
(Continued)

FOREIGN PATENT DOCUMENTS

CN 108510516 9/2018
CN 109191484 B 6/2019
CN 118967495 A * 11/2024 ............. G06V 10/25

OTHER PUBLICATIONS

Chen; Hui et al. (Power Equipment Segmentation of 3D Point Clouds Based on Geodesic Distance with K-means Clustering), Sep. 17, 2021, IEEE (Year: 2021).*
(Continued)

*Primary Examiner* — John Villecco
*Assistant Examiner* — Alejandro Hernandez
(74) *Attorney, Agent, or Firm* — Ronald Kolczynski

(57) ABSTRACT

Points are grouped from a point cloud using Concavity-induced Distance (CID). First, a set of seed points is sampled from the input point cloud. Then a grouping of points is conducted based on a nearest neighbor search computed using CID. These two steps enable two novel solutions in point cloud segmentation and scene abstraction. In one
(Continued)

embodiment, CID is determined between two points residing within an object surface. In a second embodiment, a CID is determined between groups of points.

20 Claims, 14 Drawing Sheets

(51) Int. Cl.
    *G06T 7/187*       (2017.01)
    *G06T 7/64*        (2017.01)

(52) U.S. Cl.
    CPC ............... *G06T 2207/10028* (2013.01); *G06T 2207/20081* (2013.01)

(58) Field of Classification Search
    CPC ............ G06T 2207/20081; G06T 7/11; G06V 10/806; G06V 20/64; G06V 10/82; G06V 10/26; G06V 20/56
    See application file for complete search history.

(56) References Cited

U.S. PATENT DOCUMENTS

| | | | | |
|---|---|---|---|---|
| 2016/0044295 | A1* | 2/2016 | Unten | H04N 23/667 |
| | | | | 348/50 |
| 2021/0019918 | A1* | 1/2021 | Li | G06T 9/001 |
| 2022/0156483 | A1* | 5/2022 | Sun | G06V 20/58 |
| 2023/0080574 | A1* | 3/2023 | Li | G06V 20/70 |
| | | | | 382/173 |
| 2023/0306559 | A1* | 9/2023 | Wang | G06N 3/0455 |
| 2023/0410254 | A1* | 12/2023 | Wang | G06T 9/002 |
| 2024/0212164 | A1* | 6/2024 | Li | G06T 7/11 |
| 2025/0014187 | A1* | 1/2025 | Yoon | G06T 7/11 |
| 2025/0069324 | A1* | 2/2025 | Murudkar | G06T 17/00 |
| 2025/0232557 | A1* | 7/2025 | Osep | G06V 10/764 |
| 2026/0003038 | A1* | 1/2026 | Alkanat | G01S 7/417 |

OTHER PUBLICATIONS

Hao; Su et al. (Approximate Convex Decomposition for 3D Meshes with Collision-Aware Concavity and Tree Search), May 5, 2022, arXiv (Year: 2022).*

Rui; Song et al. (Point cloud segmentation based on Euclidean clustering and multi-plane extraction in rugged field), May 28, 2021, IOP Publishing (Year: 2021).*

Li et al., Supervised Fitting of Geometric Primitives to 3D Point Clouds, In Proceedings of the IEEE/CVF Conference on Computer Vision and Pattern Recognition (CVPR), Jun. 2019.

Lien et al., Approximate Convex Decomposition of Polyhedra, In Proceedings of the 2007 ACM Symposium on Solid and Physical Modeling, pp. 121-131, 2007.

Gong et al., Point Cloud Segmentation of 3D Scattered Parts Sampled by Realsense, In 2017 IEEE International Conference on Information and Automation (ICIA), pp. 1-6. IEEE, 2017.

Lien et al., Approximate Convex Decomposition of Polyhedra and its Applications, Computer Aided Geometric Design, 25(7), pp. 503-522, 2008.

Asafi et al., Weak Convex Decomposition by Lines-of-Sight, In Computer Graphics Forum, vol. 32, pp. 23-31. Wiley Online Library, 2013.

Tateno et al., Real-Time and Scalable Incremental Segmentation on Dense SLAM, In 2015 IEEE/RSJ International Conference on Intelligent Robots and Systems (IROS), pp. 4465-4472. IEEE, 2015.

Roychoudhury et al., Plane Segmentation in Organized Point Clouds Using Flood Fill, 2021 IEEE International Conference on Robotics and Automation (ICRA), May 30, 2021, pp. 13532-13538.

Zou et al., 3d-PRNN: Generating Shape Primitives With Recurrent Neural Networks, In Proceedings of the IEEE International Conference on Computer Vision, pp. 900-909, 2017.

Qi et al., Pointnet++: Deep Hierarchical Feature Learning on Point Sets in a Metric Space, arXiv preprint arXiv:1706.02413, 2017.

Kreavoy et al., Model Composition From Interchangeable Components, In 15th Pacific Conference on Computer Graphics and Applications (PG'07), pp. 129-138, IEEE, 2007.

Tulsiani et al., Learning Shape Abstractions by Assembling Volumetric Primitives, In Proceedings of the IEEE Conference on Computer Vision and Pattern Recognition, pp. 2635-2643, 2017.

Omidalizarandi et al., Segmentation and Classification of Point Clouds from Dense Aerial Image Matching, International Journal of Multimedia & Its Applications (IJMA), vol. 5, No. 4, Aug. 31, 2013, pp. 33-51.

Kaick et al., Shape Segmentation by Approximate Convexity Analysis, ACM Transactions on Graphics (TOG), 34(1), pp. 1-11, 2014.

Poppinga et al., Fast Plane Detection and Polygonalization in Noisy 3D Range Images, Intelligent Robots and Systems, 2008, IROS, IEEE/RSJ International Conference on, Sep. 22, 2008, pp. 3378-3383.

Stein et al., Object Partitioning Using Local Convexity, In Proceedings of the IEEE Conference on Computer Vision and Pattern Recognition, pp. 304-311, 2014.

Feng et al., Fast Plane Extraction in Organized Point Clouds Using Agglomerative Hierarchical Clustering, In 2014 IEEE International Conference on Robotics and Automation (ICRA), pp. 6218-6225, IEEE, 2014.

Ghosh et al., Fast Approximate Convex Decomposition Using Relative Concavity, Computer-Aided Design, 45(2), pp. 494-504, 2013.

Rabbani et al., Segmentation of Point Clouds Using Smoothness Constraints, ISPRS 2006, Procceedings of the ISPRS Commission V. Symposium vol. 35, Part 6, Image Engineering and Vision Metrology, Dresden, Germany Sep. 25-27, 2006, pp. 248-253, vol. 35.

Stein et al., Convexity Based Object Partitioning for Robot Applications, In 2014 IEEE International Conference on Robotics and Automation (ICRA), pp. 3213-3220. IEEE, 2014.

Gadelha et al., Label-Efficient Learning on Point Clouds Using Approximate Convex Decompositions, In European Conference on Computer Vision, pp. 473-491. Springer, 2020.

Deng et al., CvxNet: Learnable Convex Decomposition, In Proceedings of the IEEE/CVF Conference on Computer Vision and Pattern Recognition, pp. 31-44, 2020.

Wang et al., Adaptive O-CNN: A Patch-Based Deep Representation of 3d Shapes, ACM Transactions on Graphics (TOG), 37(6), pp. 1-11, 2018.

* cited by examiner

Point Cloud

Initial Point Groups

Compute CID between Each Pair of Point Groups

Find the Pair of Groups with the Smallest CID

Merge the two Groups if the CID between the two is Smaller than a Threshold

Repeat Until No More Pairs to be Merged

Repeat Until No More Merges Can be Performed

Updated Point Groups

CONCAVITY-BASED GROUPING FOR UNORGANIZED 3D POINT CLOUD SEGMENTATION AND ABSTRACTION

CROSS REFERENCE TO RELATED APPLICATIONS

This application is a U.S. National Stage Application under 35 U.S.C. 371 of International Patent Application No. PCT/US2022/049655, filed Nov. 11, 2022, which is incorporated herein by reference in its entirety.

This application claims the benefit of U.S. No. 63/278, 527, filed Nov. 12, 2011, which is incorporated herein by reference in its entirety.

CROSS-REFERENCE TO RELATED APPLICATIONS

This application claims the benefit of U.S. Patent Application No. 63/278,527, filed Nov. 12, 2021, which is incorporated herein by reference in its entirety.

TECHNICAL FIELD

At least one of the present embodiments generally relates to the field of point cloud processing. This field aims to develop the tools for segmentation, compression, analysis, interpolation, representation and understanding of point cloud signals.

BACKGROUND

Point cloud is a universal data format across several business domains from autonomous driving, robotics, AR/VR, civil engineering, computer graphics, to the animation/movie industry. 3D LIDAR sensors have been deployed in self-driving cars, and affordable LIDAR sensors are released from Apple iPad Pro 2020 and Intel RealSense LIDAR camera L515. With great advances in sensing technologies, 3D point cloud data becomes more practical than ever and is expected to be an ultimate enabler in the applications mentioned.

SUMMARY

At least one of the present embodiments generally relates to a method or an apparatus for segmentation, compression, analysis, interpolation, representation and understanding of point cloud signals.

According to a first aspect, there is provided a method. The method comprises steps for sampling an input point cloud to generate seed points; generating point groups by assigning each point of said input point cloud to its nearest seed point based on concavity-induced distance.

According to another aspect, there is provided an apparatus. The apparatus comprises a processor. The processor can be configured for segmentation, compression, analysis, interpolation, representation and understanding of point cloud signals.

According to another general aspect of at least one embodiment, there is provided a device comprising an apparatus according to any of the decoding embodiments; and at least one of (i) an antenna configured to receive a signal, the signal including the video block, (ii) a band limiter configured to limit the received signal to a band of frequencies that includes a video block, or (iii) a display configured to display an output representative of a video block.

According to another general aspect of at least one embodiment, there is provided a non-transitory computer readable medium containing data content generated according to any of the described encoding embodiments or variants.

According to another general aspect of at least one embodiment, there is provided a signal comprising data generated according to any of the described encoding embodiments or variants.

According to another general aspect of at least one embodiment, a bitstream is formatted to include data content generated according to any of the described encoding embodiments or variants.

According to another general aspect of at least one embodiment, there is provided a computer program product comprising instructions which, when the program is executed by a computer, cause the computer to carry out any of the described decoding embodiments or variants.

These and other aspects, features and advantages of the general aspects will become apparent from the following detailed description of exemplary embodiments, which is to be read in connection with the accompanying drawings.

DETAILED DESCRIPTION

Figure 1:
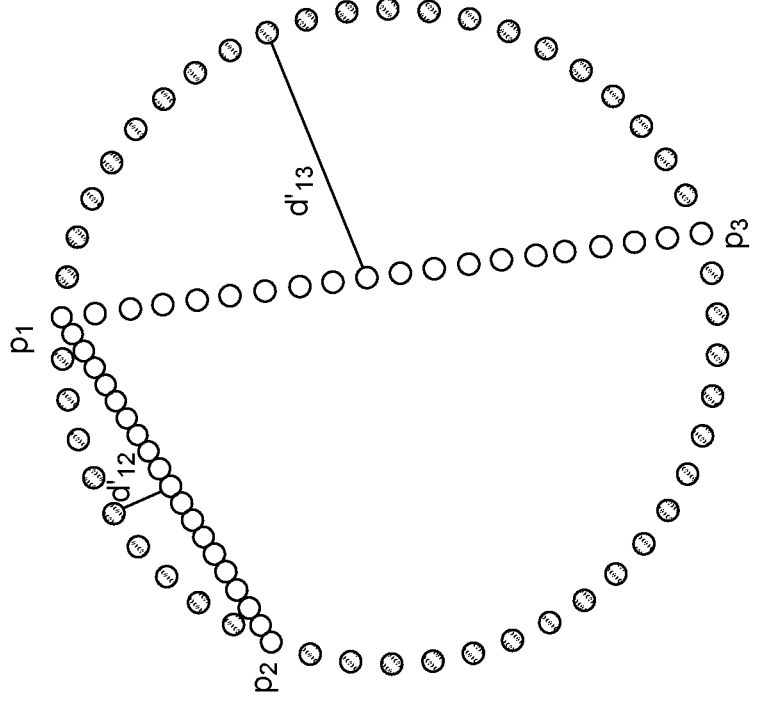
FIG. 1 illustrates an example of CID and its approximation between two points.
Figure 1:
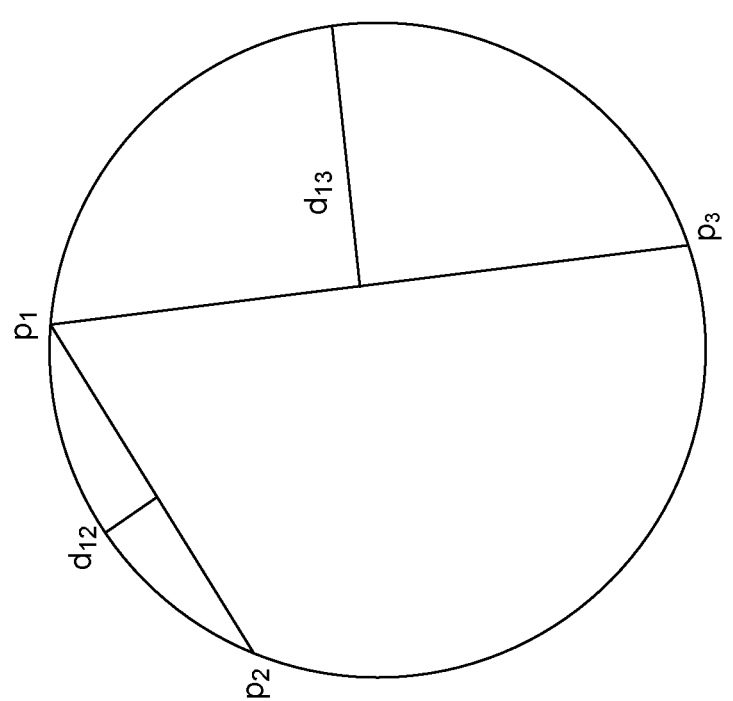

With the increasing usage of 3D point clouds in many robotics and autonomous applications, there are many tasks such as object detection, semantic segmentation, and instance segmentation that need to be completed on 3D point clouds. Therefore, algorithms on 3D point cloud understanding are developing fast. In recent years, deep learning-based methods show outstanding performance in the aforementioned tasks. However, these methods usually depend on a large amount of manually labeled data.

Furthermore, point cloud data is also believed to consume a large portion of network traffic, e.g., among connected cars over 5G network, and immersive communications (VR/AR).

Point cloud understanding and communication would essentially lead to efficient representation formats. In particular, raw point cloud data needs to be properly organized and processed for the purposes of world modeling & sensing.

The automotive industry and autonomous cars are domains in which point clouds may be used. Autonomous cars should be able to "probe" their environment to make good driving decisions based on the reality of their immediate surroundings. Typical sensors like LIDARs produce (dynamic) point clouds that are used by the decision engine. These point clouds are not intended to be viewed by human eyes and they are typically sparse, not necessarily colored, and dynamic with a high frequency of capture. They may have other attributes like the reflectance ratio provided by the LIDAR as this attribute is indicative of the material of the sensed object. Tasks that are performed on 3D point clouds such as object detection, semantic segmentation, and instance segmentation can be useful in decision making.

Virtual Reality (VR) and immersive worlds have become a hot topic and foreseen by many as the future of 2D flat video. The basic idea is to immerse the viewer in an environment all around him/her as opposed to standard TV where he/she can only look at the virtual world in front of him/her. There are several gradations in the immersivity depending on the freedom of the viewer in the environment. Point cloud is a good format candidate to distribute VR worlds. More realistic interactions can be achieved in the VR world if object detection and point cloud segmentation is performed.

3D point clouds may be also used for generating Building Information Model (BIM) for existing buildings. The buildings can be scanned using a lidar sensor, and then the building components, e.g., walls, beams, and columns etc., can be extracted by parsing the raw point cloud either manually or automatically. Again, this process also depends on object detection and point cloud segmentation Another use case is in topography and cartography in which using 3D representations, maps are not limited to the plane and may include the relief. Google Maps is now a good example of 3D maps but uses meshes instead of point clouds. Nevertheless, point clouds may be a suitable data format for 3D maps and such point clouds are typically static, colored, and huge. Semantic information can also be added to the map.

World modeling & sensing via point clouds could be an essential technology to allow machines to gain knowledge about the 3D world around them, which is crucial for the applications discussed above.

The present invention has been devised with the foregoing in mind.

Point cloud is one of the modalities of 3D data that is widely used in autonomous driving, indoor robotics, building inspection and other engineering aspects. The popularity of point cloud comes from its simple and compact data format, compared to other 3D data modalities. 3D point cloud data are essentially discrete samples on the surfaces of the 3D world. To better exploit the information of the point cloud, a usual practice is to detect objects/parts in the point cloud or segmenting the point cloud. In recent years, such tasks are more often relied on deep learning, which needs large amounts of manually labeled data, which causes high cost.

After PointNet, a simple yet effective deep network architecture that directly took point clouds as input, more and more deep learning approaches are designed for different tasks on point clouds, e.g., classification, semantic segmentation, instance segmentation, object detection, etc.

These approaches usually need large amounts of labeled data, especially for semantic and instance segmentation, where pointwise labeling is needed. For example, in the S3DIS dataset, there are over 695 million labeled points, and in the Semantic KITTI dataset, the number of labeled points reaches 4,549 million. Creating such datasets is usually expensive and time-consuming, which motivates the need for label-efficient approaches.

While supervised learning plays an important role in modern 3D point cloud analysis, we notice that concavity and convexity, as an important concept in geometry, also can be useful to understand the 3D world. According to the minima rule and short cut rule from the cognitive science, the human visual system tends to perceive region boundaries at concave creases and use the shortest possible cuts to decompose shapes into partitions. Therefore, decomposing a shape into minimal convex partitions usually ensures that these partitions are meaningful to the human visual system. In addition, certain algorithms have higher efficiency on convex shapes than non-convex shapes, which leads to the usage of convex shape decomposition in collision detection and motion planning.

Therefore, one way to alleviate the previously mentioned cost of manual labeling is to introduce the geometric properties, such as concavity and convexity in detection/segmentation tasks. However, not as its counterpart in 3D meshes, concavity and convexity in 3D point clouds has not been clearly defined and measured, which restricts the usage of concavity and convexity in 3D point clouds. Hence, it is imperative to have a method that can introduce concavity and convexity for 3D point cloud segmentation.

Although convex shape decomposition approaches have been well developed for polygons/polyhedra, their counterparts for point clouds are seldom discussed. We propose Concavity-induced Distance (CID), to measure how likely two points belong to the same convex partition. We have proved that CID satisfies the definition of distance.

As mentioned, tasks like object detection and point cloud segmentation using deep learning are heavily relied on manually labeled data. To reduce the need for manual labeling, we show that CID can facilitate object detection and point cloud segmentation with far fewer manual labels. We show that CID is useful in different 3D scene understanding tasks, including label propagation in point cloud segmentation, and 3D scene abstraction. We also show that the CID-based feature is useful in general in 3D deep learning.

Convex Shape Decomposition. The idea of decomposing an arbitrary shape into a set of convex or nearly convex partitions has a long research history and is useful in many fields. To implement such decomposition, some methods allow no measurement of concavity between two points on the shape. Other methods, however, proposed different definitions of concavity measurement between two points on the shape. One of those definitions only works on polygons or polyhedra, which is not directly applicable to point clouds. In addition, most of the prior methods require an organized data modality, i.e., polygon/polyhedron meshes or volumetric models.

3D Shape Abstraction. Representations of 3D data are usually complicated, which leads to various approaches for compact representation by a set of primitives. One prior method proposes to learn a set of oriented boxes to represent a 3D shape. Another method learns to generate 3D shapes represented by a sequence of oriented boxes with recurrent neural networks (RNN). Another prior method learns to represent a 3D shape via patches organized with octree structure. Different from our method, these methods all focused on object-level point clouds and are not directly applied to scene-level point clouds.

Concavity and Convexity in Point Cloud Segmentation. The idea of using concavity and convexity or concave boundaries for point cloud segmentation has been investigated in both vision and robotics. In previous research, people have realized the correlation between the boundary of convex partitions and the boundary of objects. Therefore, concavity-based point cloud segmentation methods are proposed. Some of the methods deal with organized point clouds captured by depth sensors, and others require point clouds with oriented normals. Different from above methods, our method does not require the point clouds to be organized or oriented.

Concavity and Convexity in 3D Deep Learning. Recently, with the development of 3D deep learning, there are some methods that introduce concavity and convexity into 3D deep learning. Cvxnet proposes to learn to reconstruct 3D meshes with a set of convex primitives. However, different from traditional convex shape decomposition, Cvxnet does not require the minimum number of convex primitives, which means that a nearly convex shape can be further divided into multiple convex primitives. Such a property is not ideal in terms of compactness. Another method proposes a method that shares the similar goal, which is reducing the number of labeled points in 3D deep learning, to one of the applications of our method. The method uses convex shape decomposition as a way to provide point-level labels efficiently. Again, these methods only work on object-level point clouds sampled from CAD models, which is quite different from the data modality that our method is dealing with.

In the following section, we first introduce a novel Concavity-induced Distance (CID) between two points, or between two groups of points. We will then discuss the properties of CID.

CID between two points ($CID_p$). The $CID_p$ between two points $p_i$, $p_j \in S$, residing within an object surface $S \subseteq \mathbb{R}^D$ is defined as the maximum distance from any point on the line segment $\overline{p_i p_j}$ to the object surface S:

$$CID_p(p_i, p_j \mid S) = \max_{p \in \overline{p_i p_j}} d(p; S). \quad (1)$$

The intuition of the above definition comes from the definition of the mutex pair in conventional convex shape decomposition: for a point pair $p_i$, $p_j$ in surface S, if there exists a point p in the line segment $\overline{p_i p_j}$, $\exists p \in \overline{p_i p_j}$, $p \notin S$, then $p_i$ and $p_j$ is called a mutex pair, which means $p_i$ and $p_j$ are not in the same convex part. However, the mutex pair definition does not work when object surface S is represented as a countable point set, i.e., a point cloud, instead of a continuous surface, because for any pair of points in this set, one can always find a point outside of this set but lie on the line segment joining that pair of points, due to the "sampling gaps" on the object surface. This limits the applicability of mutex pair in point cloud related problems.

Therefore, instead of predicating whether $p_i$ and $p_j$ is a mutex pair, we use $CID_p(p_i, p_j)$ to measure how likely a point pair $p_i$, $p_j$ is a mutex pair, as the object surface S is represented as a point cloud. Here, d(p; S) is the point to set distance between p and S. A higher d(p; S) means a lower likelihood that $p \in S$. Therefore, $CID_p$, the maximum d(p; S) for $p \in \overline{p_i p_j}$, could be used to quantify the likelihood that $p_i$ and $p_j$ are from the same convex part of the shape S, which is different from the original definition of mutex pair that only checks the existence of p.

Approximation of $CID_p$. In practice, S is usually represented as a point cloud with N points: $S=\{p_k \mid k \in [0,N)\}$. Therefore, d(p, S) can be calculated as:

$$d(p, S) = \min_{0 \le k < N} \|p - p_k\|.$$

Besides, we can also discretize $\overline{p_i p_j}$ into a set of M points $L=\{p_l \mid l \in [0,M)\}$, and the $CID_p(p_i, p_j)$ can be approximated as:

$$CID_p(p_i, p_j \mid S) \approx \max_{0 \le l < M} \min_{0 \le k < N} \|p_l - p_k\|. \quad (2)$$

The above equation (2) is more feasible and easier for computational implementation, thus used throughout our experiments instead of equation (1).

FIG. 1 demonstrates an example of $CID_p$ and its approximation of two point pairs. The ring-shaped point cloud represents an object surface S. And $p_1$, $p_2$ and $p_3$ are three points on the surface. The $CID_p$ is indicated by the lines marked with ($d_{12}$, $d_{13}$, $d'_{12}$, $d'_{13}$). On the left: $d_{12}$ and $d_{13}$ show the $CID_p(p_1, p_2)$ and $CID_p(p_1, p_3)$ calculated by equation (1). On the right: $d'_{12}$ and $d'_{13}$ show the approximation of $CID_p$ by discretizing the line segments $\overline{p_1 p_2}$ and $\overline{p_1 p_3}$, as in equation (2). In this example, since $d_{13}$ is greater than $d_{12}$, we claim that the point pair $p_1$ and $p_3$ is more likely to be a mutex pair than the point pair $p_1$ and $p_2$. This claim is aligned with human intuition since the shape of the points between $p_1$ and $p_3$ are "more" concave than those between $p_1$ and $p_2$. Besides, the approximation ($d'_{12}$ and $d'_{13}$) is very close to the accurate $CID_p$ ($d_{12}$ and $d_{13}$).

CID between two groups of points ($CID_g$). The $CID_g$ between two groups of points $G_i$, $G_j \subseteq S$, given a point set $S \subseteq \mathbb{R}^D$ is defined as the average $CID_p$ for all pairs of points (p, q), where $p \in G_i$, $q \in G_j$.

$$CID_g(G_i, G_j \mid S) = \frac{\sum_{p \in G_i} \sum_{q \in G_j} CID_p(p, q \mid S)}{n(G_i)n(G_j)},$$

where n(•) is the number of points in the point set.

The definition of $CID_g$ is a very natural extension of $CID_p$. $CID_g$ captures the likelihood that two groups of points are on the same convex part of the shape S. The higher $CID_g$ indicates the lower likelihood.

Approximation of $CID_g$. To improve the computational efficiency, we use a downsampled point set $$G'_i \subset G_i, G'_j \subset G_j$$

to compute $$CID_g(G'_i, G'_j \mid S)$$

as an approximation to $CID_g(G_i,G_j \mid S)$:

$$CID_g(G_i, G_j \mid S) \approx CID_g(G'_i, G'_j \mid S)$$

The downsampling is performed in a uniform manner in one embodiment.

7

8

Figure 2:
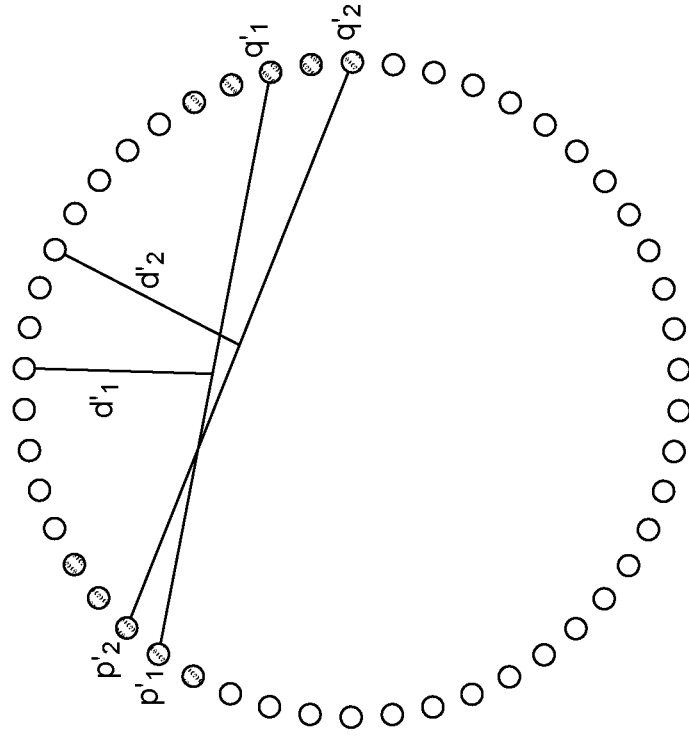
FIG. 2 illustrates an example of CID between two groups of points.
Figure 2:
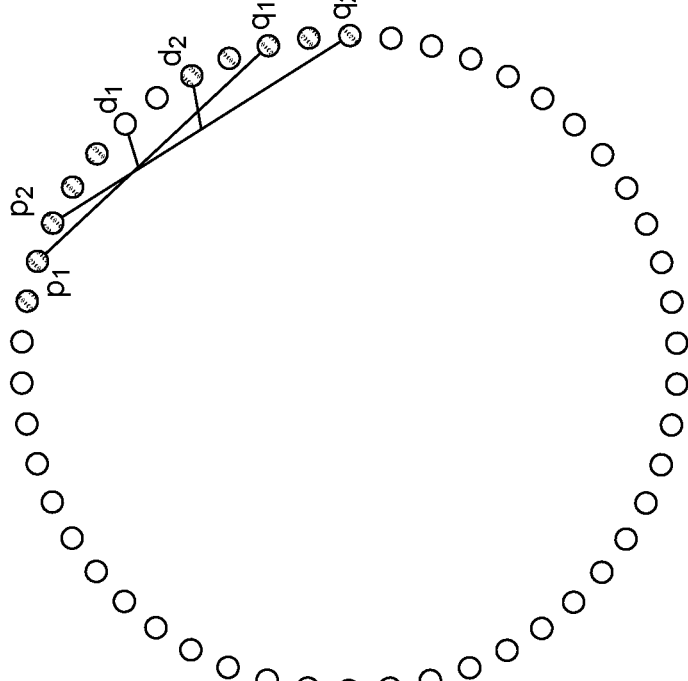

FIG. 2 demonstrates $CID_g$. Dark dots ($G_i$ and $G_j$) are two subsets of the ring-shaped point cloud (S). ($p_m$, $q_m$) and $$(p'_m, q'_m)(m = 1, 2) \qquad 5$$

are example point pairs between $G_i$ and $G_j$. $d_m$ and $d'_m$ indicate the $CID_p$ between the point pairs. On the left shows a smaller $CID_g(G_i, G_j|S)$, while on the right shows a larger example. $d_1$ and $d_2$ (left) are smaller than $d'_1$ and $d'_2$ (right), which indicates that point pairs between $G_i$ and $G_j$ usually have smaller $CID_p$ in the left than in the right. Therefore, $CID_g(G_i, G_j|S)$ is smaller in the left than in the right, which means that $G_i$ and $G_j$ in the left are more likely to be on the same convex part of the shape S.

Properties of CID
$CID_p$ is non-negative: $CID(p_i, p_j|S) \geq 0$.
$CID_p$ is symmetric: $CID(p_j, p_j|S) = CID(p_j, p_i|S)$.
$CID_p$ is reflexive: $CID(p_j, p_i|S) = 0$.
$CID_p$ is a distance, but not a metric, because it does not satisfy the triangle inequality.
$CID_p$ is rotational and translational invariant.

Time and space complexity. According to equation (2), the time complexity to compute $CID_g$ is O(MN). In practice, we usually set M constant. In this case, the time complexity becomes O(N). The space complexity is the same as the time complexity.

Figure 3:
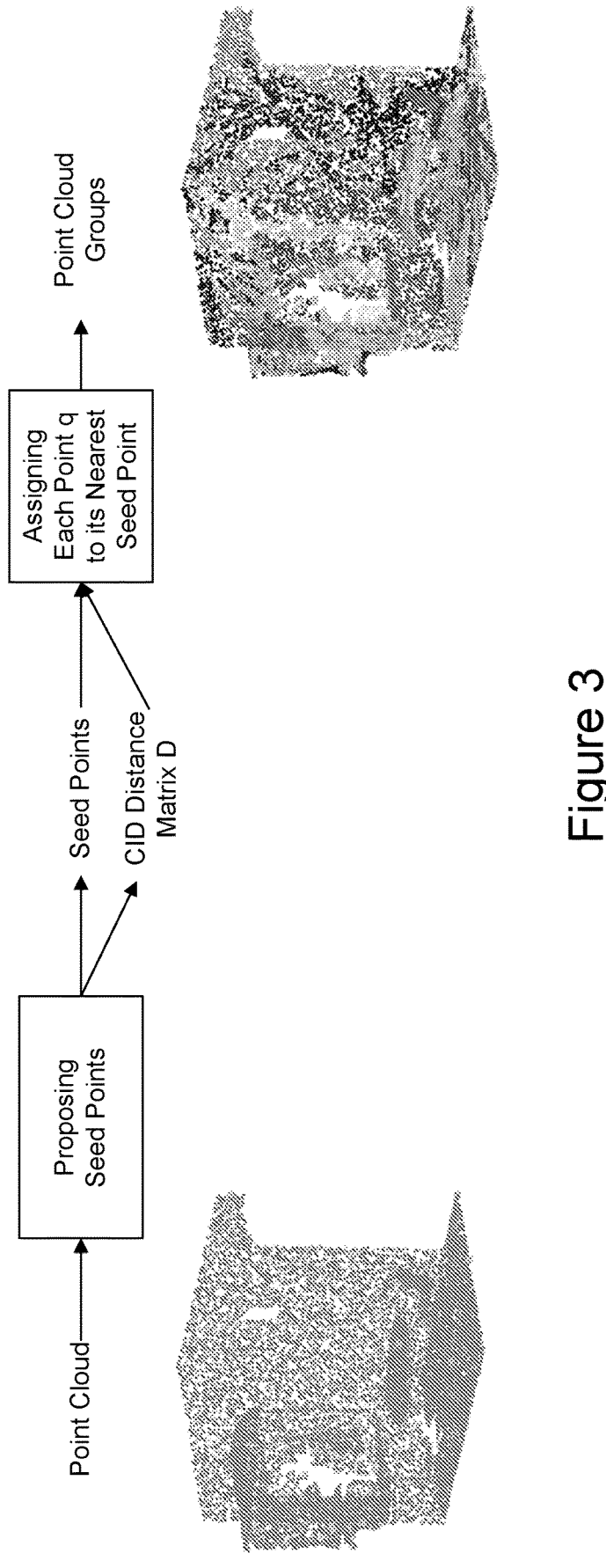
FIG. 3 illustrates an example Point Grouping by CID

Point Cloud Grouping
A proposed point cloud grouping pipeline based on the above CID is described in FIG. 3. This grouping pipeline comprises of the following two core steps of our invention, which serves as the foundational steps of applications using our novel CID definition.

Figure 4:
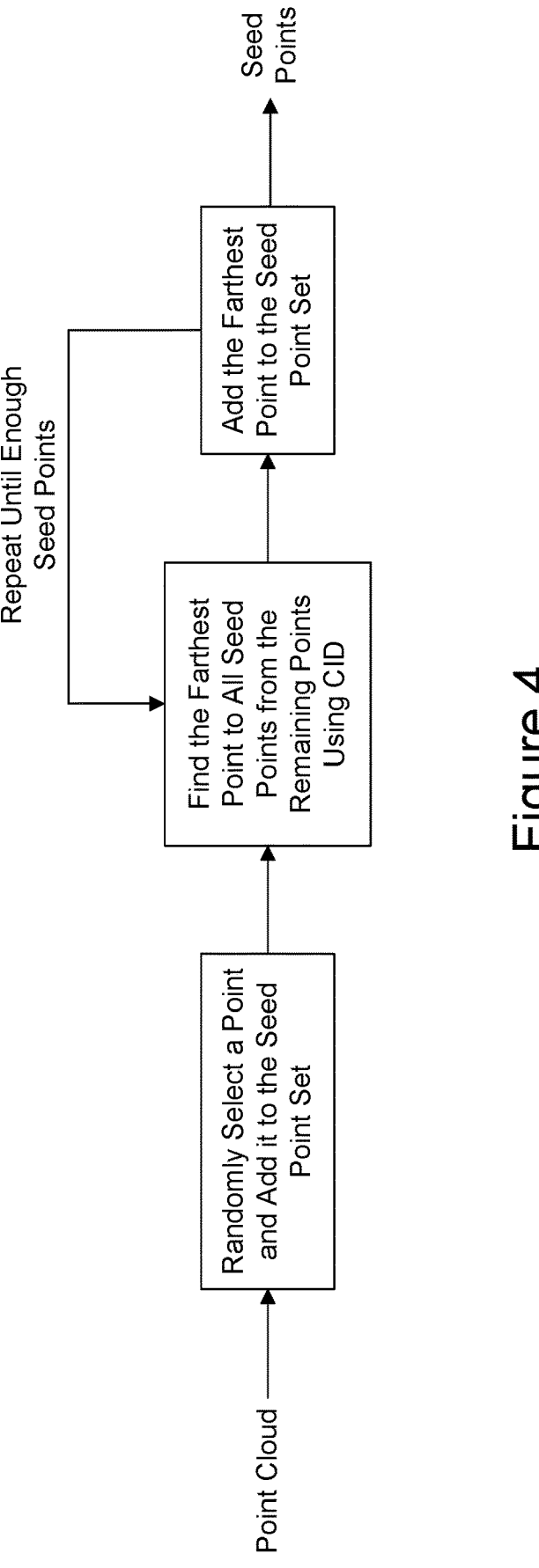
FIG. 4 illustrates an example CID-FPS.

Seed-point proposal. The first step of the point cloud grouping is to propose seed points, denoted as $S_l$. We found that the seed-point proposal method has significant influence on the performance of applications such as label propagation and scene abstraction, which will be explained in section 4.2.1 and 4.2.2. We propose to use CID-based Farthest Point Sampling (CID-FPS) to select seed points since we want the seed points to be well-distributed among different convex parts of S. The process of CID-FPS is similar to the original FPS proposed by another method, while the only difference is that we replace the Euclidean distance with $CID_p$. This process is further illustrated in the FIG. 4. We use K as a hyper-parameter to determine the number of seed points. Usually, K should be no less than the number of convex partitions in S. More complex scenes usually need larger K.

Point grouping. Once the seed points are proposed, an N×K distance matrix D is calculated. Each row represents the $CID_p$ distance from a non-seed point to all seed points. So, this distance matrix contains $CID_p$ between all pairs of seed point and non-seed point. Each non-seed point can be then assigned to its $CID_p$-closest seed point, which can be implemented as a row-wise argmin in D. Therefore, all points in S can be segmented into K groups.

Two applications are further enabled by this grouping, which we described below.

Label Propagation Using CID for Segmentation
Label propagation is a semi-supervised machine learning technique that propagates labels from a small set of labeled data points to unlabeled ones based on some rules. $CID_p$ is proposed to be used to define rules in label propagation for point cloud semantic or instance segmentation. Suppose $S \subset \mathbb{R}^D$ is a point set. $S_l \subset S$ is a labeled point set with K points, and the complement set $S_u \triangleq S \backslash S_l$ is an unlabeled point set with N points. For any point $p_i \in S_l$ with a label $\rho_i$, a group of unlabeled points $G_i$ can be assigned with the same label if $p_i$ is their closest point in $S_l$, in terms of $CID_p$, i.e., $$G_i = \{q \mid p_i = \operatorname{argmin}_{p \in S_l} CID_p(p, q), q \in S_u\},$$

and $$S_u = U_{i=1}^K G_i \text{ and } G_i \cap G_j = \varnothing, \text{ if } i \neq j.$$

Figure 5:
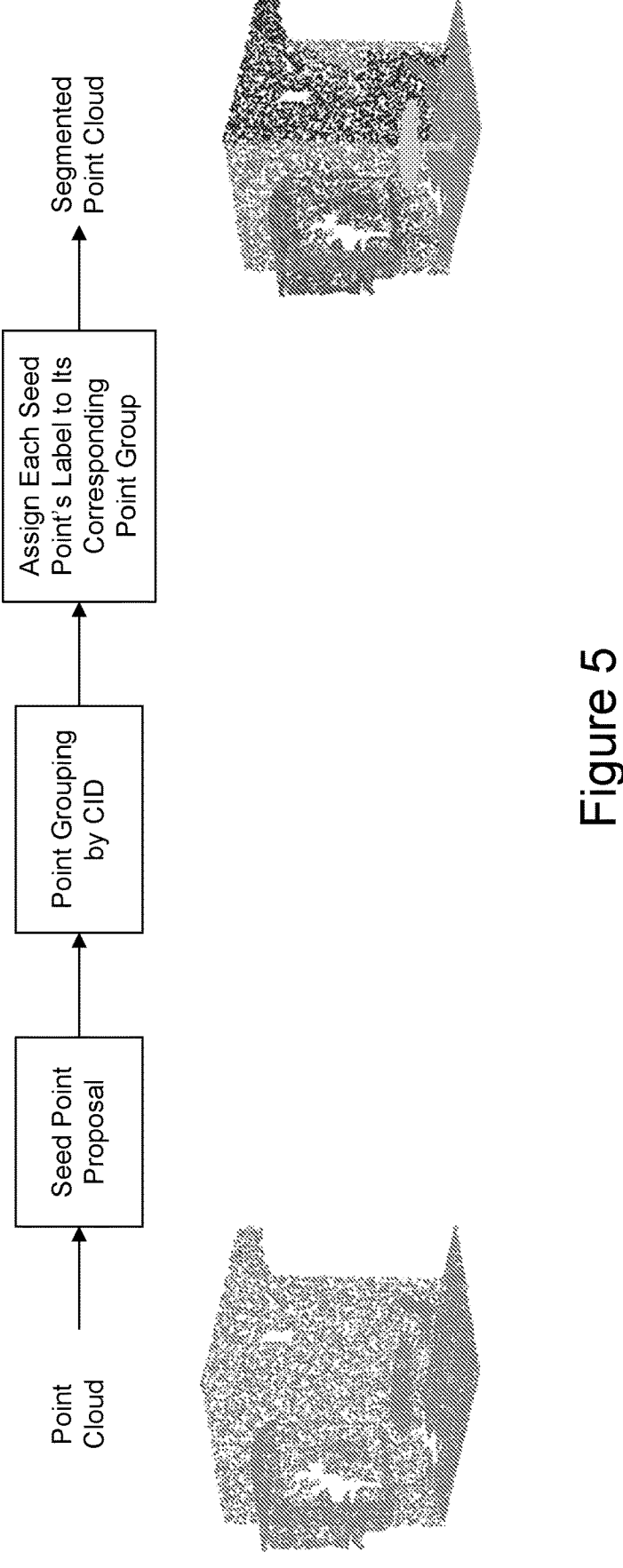
FIG. 5 illustrates an example Label propagation using CID for segmentation.

The whole process can be divided into three steps: seed-point proposal, point grouping, and group labeling, as illustrated in FIG. 5. The first two steps are described in the beginning of this subsection already.

Group labeling. After grouping, each group of points $G_i$ is assigned with the same label $\rho_i$ from its corresponding seed point.

Scene Abstraction
The idea that 3D objects can be abstracted as a set of parameterized volumetric primitives (e.g., boxes/cylinders/spheres) has been studied in vision, graphics, and robotics, including some recent works using deep learning. Differently, we propose to use CID to abstract a 3D scene by first decomposing a 3D point cloud into a set of nearly convex groups and then computing the corresponding convex hull for each group, so the set of convex hulls become a non-parametric abstraction of the scene.

Figure 6:
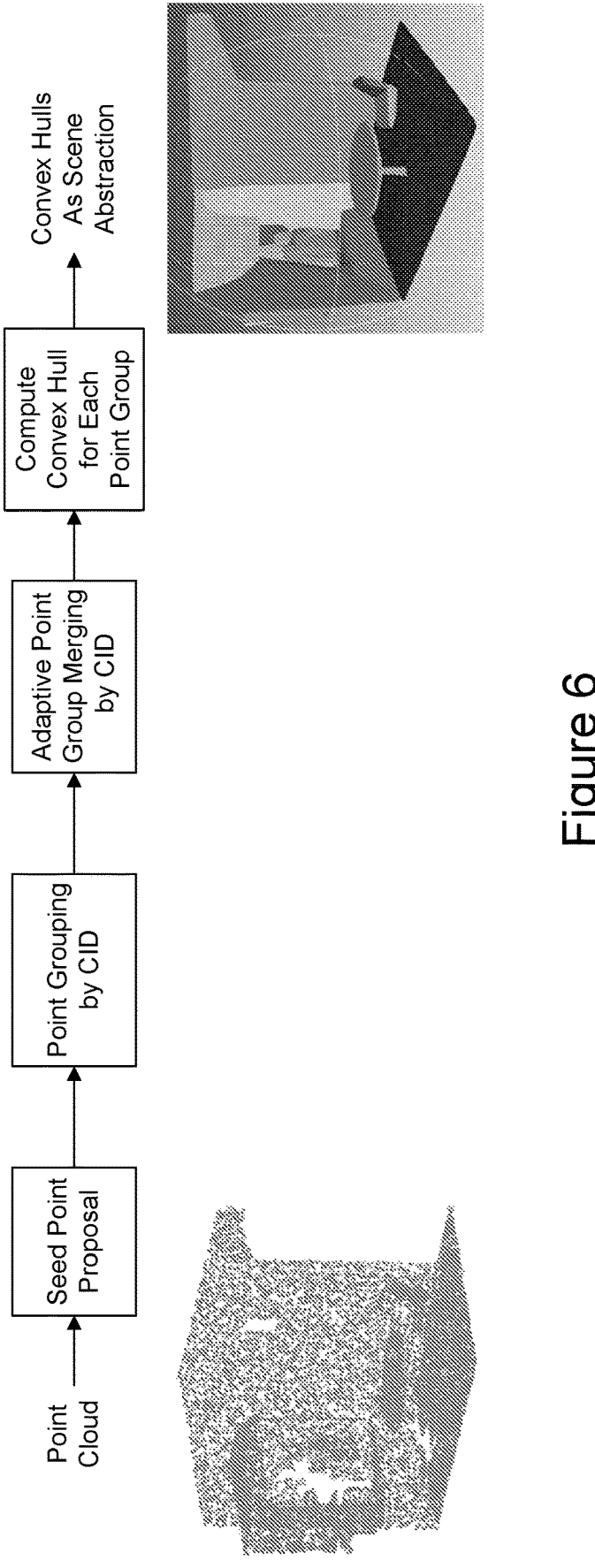
FIG. 6 illustrates an example Scene abstraction using CID.

The process of scene abstraction is illustrated in FIG. 6. Similarly, the first two steps of this application are seed-point proposal and point grouping as described in the beginning of this subsection. Because our scene abstraction problem is unsupervised, different from label propagation, there is no ground truth label to be propagated into each group $G_i$ after point grouping. Instead, the initial K groups $\{G_i|i \in [0, K)\}$ will be adaptively merged to K' (K'≤K) new groups $$\{G'_j\}$$

to alleviate over segmentation.

Figure 7:
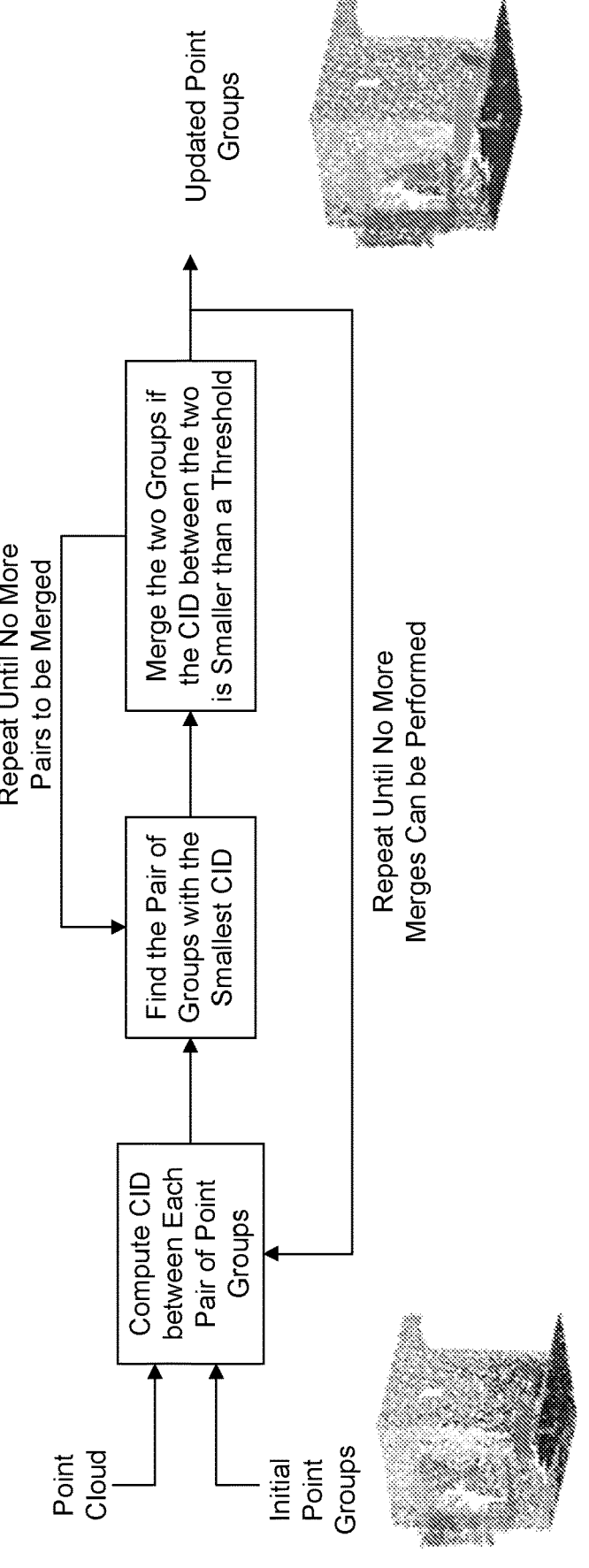
FIG. 7 illustrates Adaptive point group merging.

Adaptive group merging. We use a iterative merging strategy as described as follows. For each merging iteration, we calculate $CID_g(G_i, G_j|S)$ for each pair of ($G_i$, $G_j$), wherein i≠j. Then we sequentially merge the pair whose $CID_g$ is less than a certain threshold E, and a pair with smaller $CID_g$ is always merged first. Note that during the same merging iteration, if ($G_i$, $G_j$) has been merged already, then neither of the two groups would be merged to other groups, i.e., other pairs involving $G_i$ or $G_j$ are removed from the merging consideration. In the next merging iteration, the pairwise $CID_g$ is re-calculated based on the new groups. The detail of this step is explained in FIG. 7.

Scene abstraction by convex hull. After adaptive group merging, the convex hull for each group are calculated. Such kind of non-parametric scene abstractions can be used for object proposal, instance segmentation, collision avoidance and motion planning, etc.

Figure 8:
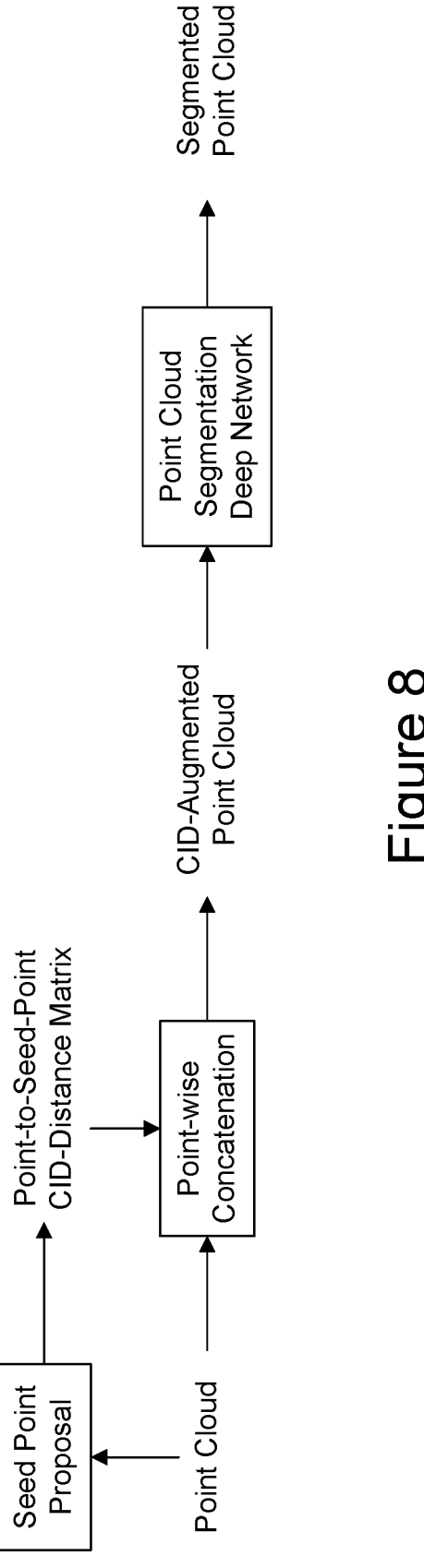
FIG. 8 illustrates CID-based Deep Learning for Point Cloud Segmentation.

Deep Learning Based Point Cloud Segmentation Using CID
Besides section 4.2.1 and 4.2.2 are non-learning-based application of CID-based point grouping, we also propose to augment a deep-learning-based point cloud segmentation framework using CID as additional input features. By computing CID from each point in the input point cloud to a set of seed points, we can obtain a point-wise CID-based feature. Concatenating this CID-based feature to the input point cloud coordinates gives us a CID-augmented point cloud. Then instead of the raw input point cloud, we propose using the CID-augmented point cloud as input for an existing deep networks-based point cloud segmentation framework. Because CID provides heuristic information about concavity and convexity among different groups/parts of the point cloud, we can obtain better semantic or instance segmentation performance than using a plain point cloud as input. This generic process is illustrated in FIG. 8. Next, we propose two categories of approaches to obtain the seed points.

Figure 9:
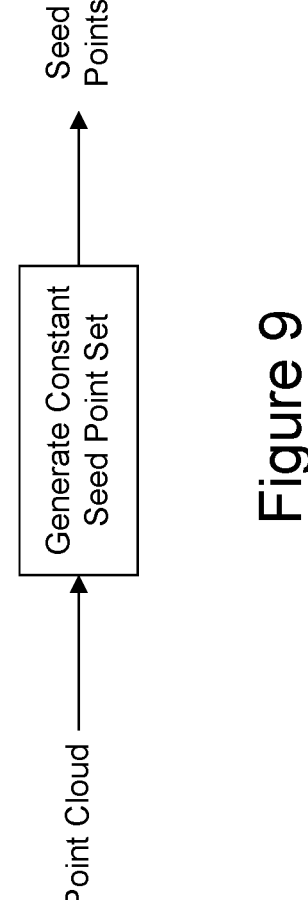
FIG. 9 illustrates Propose a Constant Seed Point Set.
Figure 10:
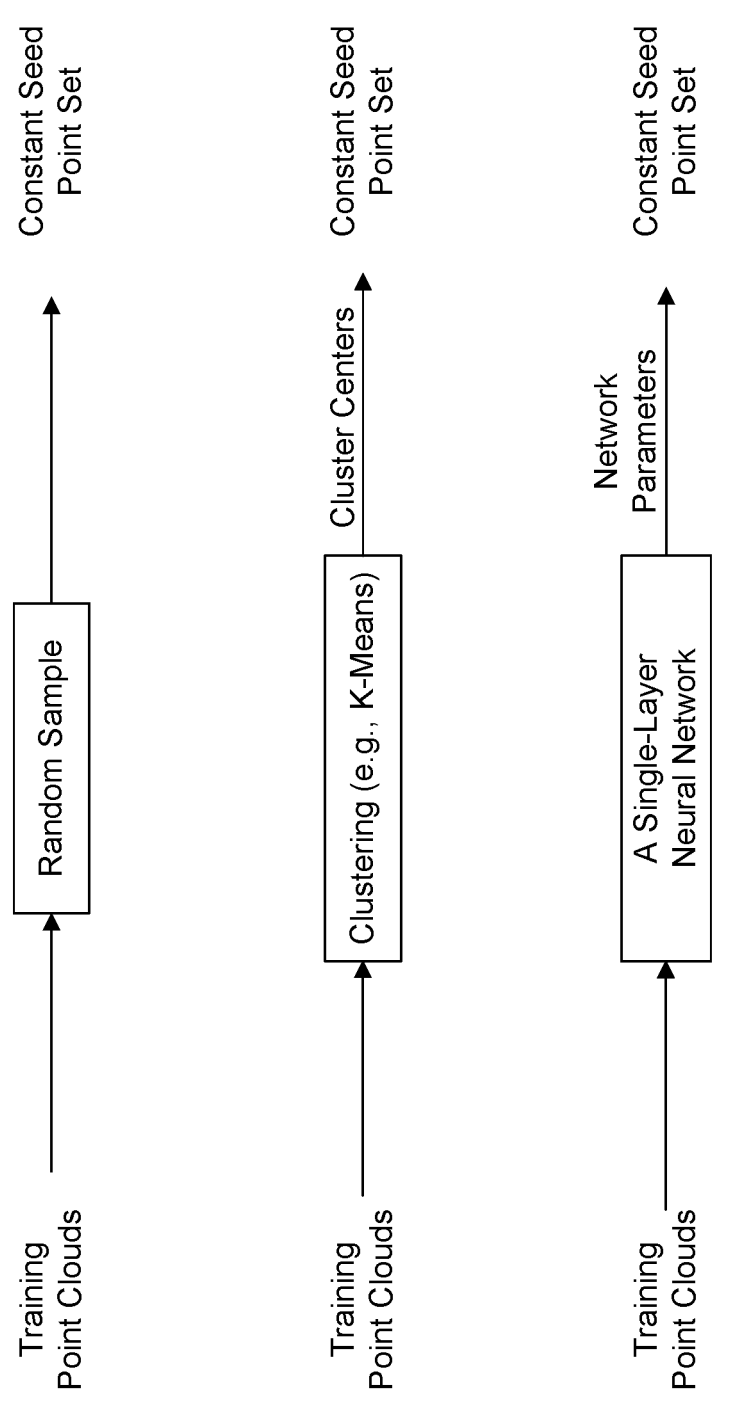
FIG. 10 illustrates Methods for obtaining constant seed point set.

With the first category of methods, a set of constant seed point positions are to be used that do not change with respect to the input point clouds during inference. As illustrated in FIG. 9, when a module is triggered by receiving an input point cloud, it outputs a constant seed point set. Further, we show in FIG. 10, how the module to output constant seed point set could be obtained. In one embodiment, it is proposed to randomly sample K points in the 3D space, and the sampled 3D points is the defined constant seed point set. Alternatively, the random sampling is performed on a fused large point cloud from an input training point cloud dataset. In another embodiment, we propose to perform a clustering procedure, e.g., K-means, on a fused and large input training point cloud dataset. In yet another embodiment, a simple single-layer neural network is proposed to generate a constant seed point set, wherein the single-layer network's parameters are interpreted as the seed point positions. The network's parameter or the seed point positions are obtained via a joint training with the downstream point cloud segmentation deep network.

Figure 11:
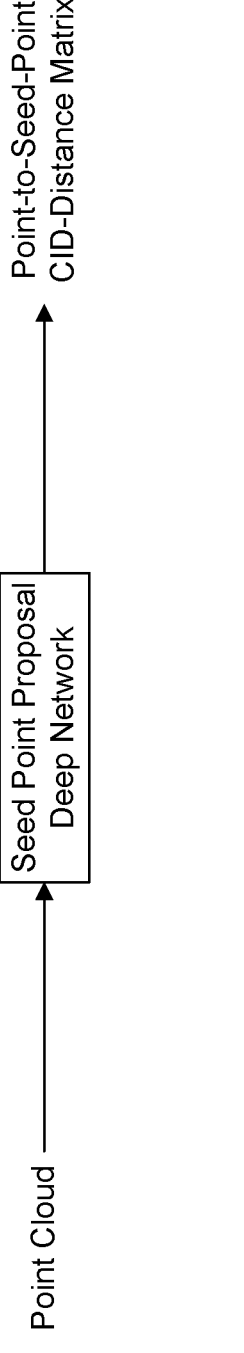
FIG. 11 illustrates Seed Point Proposal using Deep Network.
Figure 12:
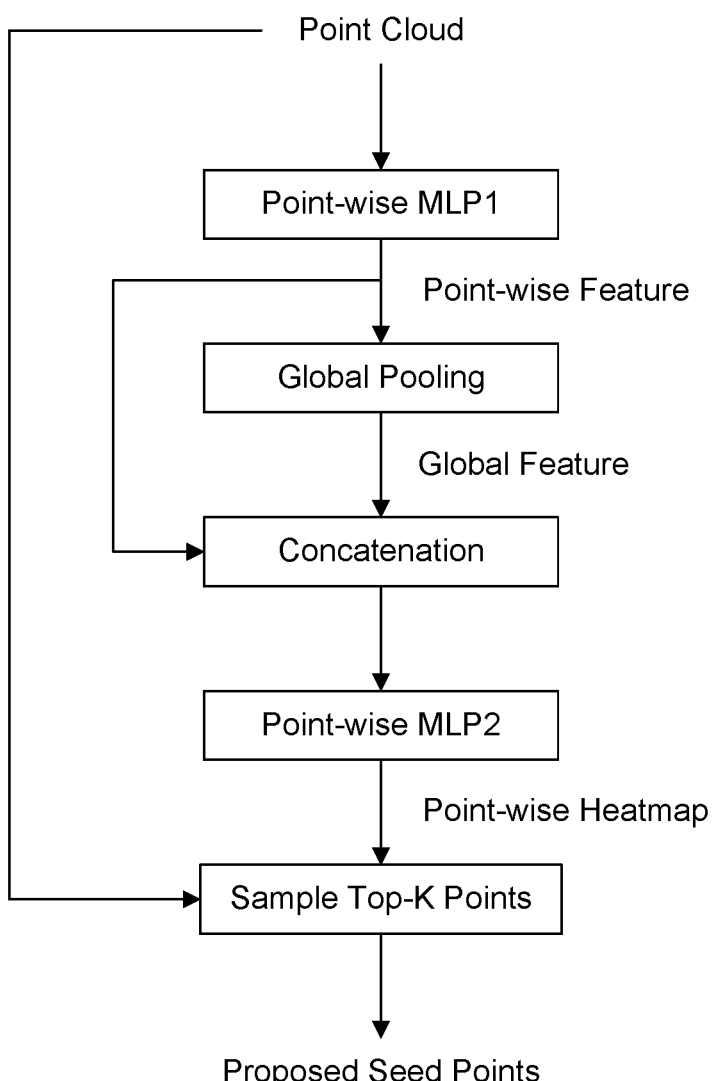
FIG. 12 illustrates An Implementation of the Seed Point Proposal Deep Network.

The second category of methods is to utilize a dedicated seed point proposal network that can output a set of seed points specific to the input point cloud, as illustrated in FIG. 11. The training of the dedicated seed point proposal network is done jointly with the downstream segmentation network (in FIG. 8). An implementation of such a seed point proposal network is further shown in FIG. 12. An input point cloud first goes through a point-wise MLP (multi-layer perceptron) network, MLP1, to obtain a feature for every point. The point-wise features describe the local characteristics of each point. In one example, MLP1 is a multi-layer perceptron network with 32, 64, 64, 128, 256 hidden neurons in each of its five layer respectively. Then the point-level features are subject to a global pooling and output a global feature that is a summary of the input point cloud. Next, the global feature is concatenated to each point-wise feature, that is used as input to a second MLP network, MLP2, that would output a point-wise heatmap. That is, each point has a score. Finally, the K points with highest scores are proposed to be selected as the seed points. MLP2 is composed of hidden neural layers with 512, 256, 128, 64, 1 hidden neurons in each of its five layer respectively.

In these embodiments, we propose to group points in a point cloud using CID. First, a set of seed points is sampled from the input point cloud. Then a grouping of points is conducted based on the nearest neighbor search computed using CID. These two steps enable two novel solutions in point cloud segmentation and scene abstraction.

Figure 13:
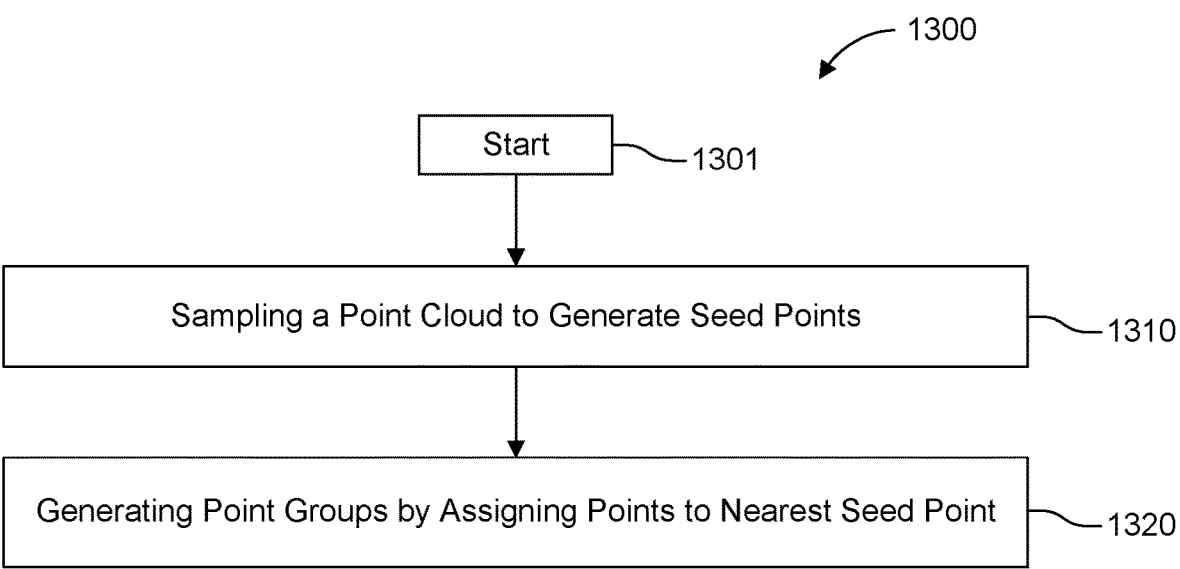
FIG. 13 illustrates one embodiment of a method under the generally described aspects.

One embodiment of a method 1300 under the general aspects described here is shown in FIG. 13. The method commences at start block 1301 and control proceeds to block 1310 for sampling an input point cloud to generate seed points. Control proceeds from block 1310 to block 1320 for generating point groups by assigning each point of said input point cloud to its nearest seed point based on concavity-induced distance.

Figure 14:
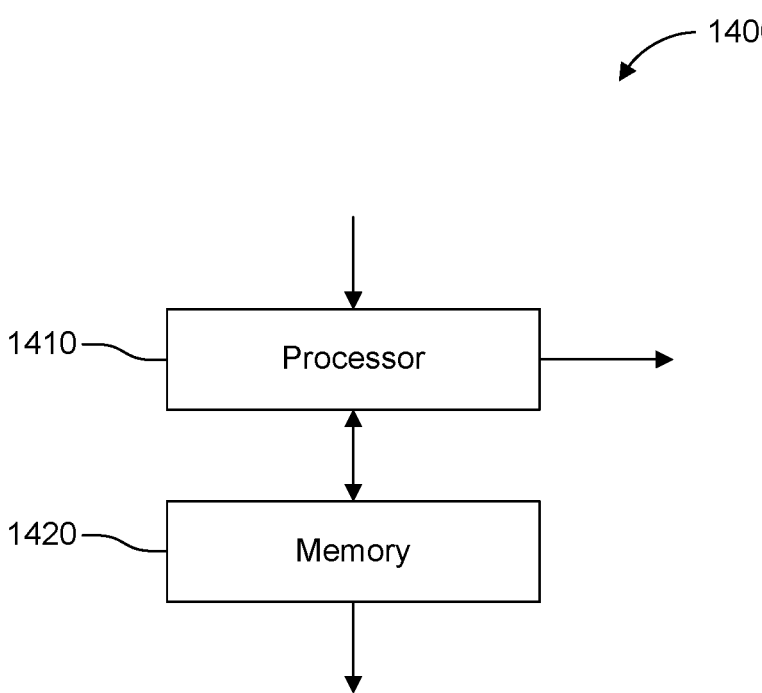
FIG. 14 illustrates one embodiment of an apparatus under the generally described aspects.

FIG. 14 shows one embodiment of an apparatus 1400 for segmentation, compression, analysis, interpolation, representation and understanding of point cloud signals. The apparatus comprises Processor 1410 and can be interconnected to a memory 1420 through at least one port. Both Processor 1410 and memory 1420 can also have one or more additional interconnections to external connections.

Processor 1410 is also configured to either insert or receive information in a bitstream and, performing either segmentation, compression, analysis, interpolation, representation and understanding of point cloud signals using any of the described aspects.

The embodiments described here include a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

The aspects described and contemplated in this application can be implemented in many different forms. FIGS. 13 and 14 provide some embodiments, but other embodiments are contemplated and the discussion of FIGS. 13 and 14 does not limit the breadth of the implementations. At least one of the aspects generally relates to segmentation, compression, analysis, interpolation, representation and understanding of point cloud signals. These and other aspects can be implemented as a method, an apparatus, a computer readable storage medium having stored thereon instructions for segmentation, compression, analysis, interpolation, representation and understanding of point cloud signals according to any of the methods described, and/or a computer readable storage medium having stored thereon a bitstream generated according to any of the methods described.

Various methods are described herein, and each of the methods comprises one or more steps or actions for achieving the described method. Unless a specific order of steps or actions is required for proper operation of the method, the order and/or use of specific steps and/or actions may be modified or combined.

Various numeric values are used in the present application. The specific values are for example purposes and the aspects described are not limited to these specific values.

FIG. 14 illustrates a block diagram of an example of a system in which various aspects and embodiments are implemented. System 1400 can be embodied as a device including the various components described below and is configured to perform one or more of the aspects described in this document. Examples of such devices include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit (IC), multiple ICs, and/or discrete components. For example, in at least one embodiment, the processing and encoder/decoder elements of system 1000 are distributed across multiple ICs and/or discrete components.

In various embodiments, the system 1000 is communicatively coupled to one or more other systems, or other electronic devices, via, for example, a communications bus or through dedicated input and/or output ports. In various embodiments, the system 1000 is configured to implement one or more of the aspects described in this document.

The system 1000 includes at least one processor 1410 configured to execute instructions loaded therein for implementing, for example, the various aspects described in this document. Processor 1410 can include embedded memory, input output interface, and various other circuitries as known in the art. The system 1400 includes at least one memory 1420 (e.g., a volatile memory device, and/or a non-volatile memory device). System 1400 can include a storage device, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device can include an internal storage device, an attached storage device (including detachable and non-detachable storage devices), and/or a network accessible storage device, as non-limiting examples.

Program code to be loaded onto processor 1410 to perform the various aspects described in this document can be stored in a storage device and subsequently loaded onto memory 1420 for execution by processor 1410. In accordance with various embodiments, one or more of processor 1410, memory 1420, or a storage device can store one or more of various items during the performance of the processes described in this document.

In some embodiments, memory inside of the processor 1410 and/or the memory 1420 is used to store instructions and to provide working memory for processing that is needed. In other embodiments, however, a memory external to the processing device (for example, the processing device can be either the processor 1410 or an external device) is used for one or more of these functions. The external memory can be the memory 1420 and/or a storage device, for example, a dynamic volatile memory and/or a non-volatile flash memory. In several embodiments, an external non-volatile flash memory is used to store the operating system of, for example, a television.

The embodiments can be carried out by computer software implemented by the processor 1410 or by hardware, or by a combination of hardware and software. As a non-limiting example, the embodiments can be implemented by one or more integrated circuits. The memory 1420 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1410 can be of any type appropriate to the technical environment, and can encompass one or more of microprocessors, general purpose computers, special purpose computers, and processors based on a multi-core architecture, as non-limiting examples.

When a figure is presented as a flow diagram, it should be understood that it also provides a block diagram of a corresponding apparatus. Similarly, when a figure is presented as a block diagram, it should be understood that it also provides a flow diagram of a corresponding method/process.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C).

This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of transforms, coding modes or flags. In this way, in an embodiment the same transform, parameter, or mode is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

We describe a number of embodiments, across various claim categories and types. Features of these embodiments can be provided alone or in any combination. Further, embodiments can include one or more of the following features, devices, or aspects, alone or in any combination, across various claim categories and types, including sampling a subset of points, termed as seed points, from the input point cloud and/or generating point groups by assigning each point to its nearest seed point in terms of the concavity-induced distance (CID).

A point cloud segmentation method based on the above embodiments, wherein each seed point has access to its semantic or instance label, includes propagating each seed point's label to all the points in the group of this seed point in the above embodiments.

An adaptive point cloud grouping method based on any of the above embodiments includes computing the CID between each pair of groups in the embodiment above; merging the pairs of groups whose CID is less than a predefined threshold; and iterating the above two steps until no further merging is possible.

A scene abstraction method based on the above embodiments includes computing the convex hull of each group of points and outputting the set of convex hulls as the abstract representation of the scene.

In one embodiment the seed points are sampled via farthest point sampling based on CID.

In a method based on the above embodiments, the CID between a pair of groups is calculated as the averaged CID between point pairs sampled from the two groups.

A method based on the above embodiments, wherein the computing of CID between a pair of groups includes selecting a first point in the first group and a second point in the second group; computing the CID between the first and the second points; and using the computed CID as the CID between the pair of groups.

A method based on the above embodiments, wherein the computing of CID between a pair of groups includes iterating the selection of point pairs and their CID computation and using the averaged CID as the CID between the pair of groups.

In a method based on the above embodiments, the merging always starts from the closest pairs in terms of CID.

The present disclosure contemplates creating and/or transmitting and/or receiving and/or decoding according to any of the embodiments described, and methods, processes, apparatuses, mediums storing instructions, mediums storing data, or signals according to any of the embodiments described.

In one embodiment, elements are inserted in the signaling syntax that enable the decoder to determine decoding information in a manner corresponding to that used by an encoder.

In one embodiment, a deep-learning-based point cloud segmentation is augmented by CID-distance matrix between input points and seed points as features, and then trained on a deep learning point cloud segmentation network.

In one embodiment, clustering (such as K-means) is performed on all points in the training point clouds, and the cluster centers are used as seed points.

In one embodiment, seed points are randomly sampled from all points in the training point clouds.

In one embodiment, seed points are parameters of a single-layer neural network that is learned while training the deep learning point cloud segmentation network.

In one embodiment, seed points are proposed by a different deep neural network based on the input point cloud.

The present disclosure contemplates creating and/or transmitting and/or receiving and/or decoding a bitstream or signal that includes one or more of the described syntax elements, or variations thereof.

In one embodiment, a TV, set-top box, cell phone, tablet, or other electronic device performs transform method(s) according to any of the embodiments described.

In one embodiment, a TV, set-top box, cell phone, tablet, or other electronic device performs transform method(s) determined according to any of the embodiments described, and displays (e.g., using a monitor, screen, or other type of display) a resulting image.

In one embodiment, a TV, set-top box, cell phone, tablet, or other electronic device selects, bandlimits, or tunes (e.g., using a tuner) a channel to receive a signal including an encoded image, and performs transform method(s) according to any of the embodiments described.

In one embodiment, a TV, set-top box, cell phone, tablet, or other electronic device receives (e.g., using an antenna) a signal over the air that includes an encoded image, and performs transform method(s).

The invention claimed is:

1. A method, comprising:

sampling an input point cloud to generate seed points; and, generating point groups by assigning each point of said input point cloud to its nearest seed point based on concavity-induced distance (CID) wherein concavity-induced distance is a maximum distance from any point on a line segment to an object surface.

2. The method of claim 1, wherein each seed point has access to its semantic or instance label, further comprising:
    propagating each seed point's label to all points in said point group of this seed point.

3. The method of claim 1, further comprising:
    computing a CID between each pair of point groups;
    merging said pairs of point groups whose CID is less than a predefined threshold; and,
    Iterating computing and merging steps until no further merging is possible.

4. The method of claim 3, further comprising:
    computing a convex hull of each point group; and,
    determining a set of convex hulls as an abstract representation of a scene.

5. The method of claim 3, wherein said CID between a pair of groups is calculated as an average CID between point pairs sampled from two groups.

6. The method of claim 3, wherein computing a CID between a pair of groups comprises:
    selecting a first point in a first group and a second point in a second group;
    computing the CID between said first and second points; and,
    using said computed CID as the CID between the pair of groups.

7. The method of claim 6, wherein said computing of CID between said pair of groups comprises:
    iterating selection of point pairs and said computed CID; and,
    using an averaged CID as the CID between said pair of groups.

8. The method of claim 3, wherein merging starts from closest pairs in terms of CID.

9. The method of claim 1, wherein said seed points are sampled via farthest point sampling based on CID.

10. The method of claim 1, wherein the input point cloud is augmented by CID-distance matrix between input points and said seed points as features, and then trained on a deep learning point cloud segmentation network.

11. The method of claim 10, wherein clustering is performed on all points in training point clouds, and cluster centers are used as said seed points.

12. The method of claim 10, wherein said seed points are randomly sampled from all points in the training point clouds.

13. The method of claim 10, wherein said seed points are parameters of a single-layer neural network that is learned while training the deep learning point cloud segmentation network.

14. The method of claim 10, wherein said seed points are proposed by a different deep neural network based on the input point cloud.

15. An apparatus, comprising:
    a processor, configured to perform:
    sampling an input point cloud to generate seed points; and,
    generating point groups by assigning each point of said input point cloud to its nearest seed point based on concavity-induced distance wherein concavity-induced distance (CID) is a maximum distance from any point on a line segment to an object surface.

16. The apparatus of claim 15, wherein each seed point has access to its semantic or instance label, further comprising:
    propagating each seed point's label to all points in said point group of this seed point.

17. The apparatus of claim 15, further comprising:
    computing a CID between each pair of point groups;
    merging said pairs of point groups whose CID is less than a predefined threshold; and,
    Iterating computing and merging steps until no further merging is possible.

18. The apparatus of claim 17, further comprising:
    computing a convex hull of each point group; and,
    determining a set of convex hulls as an abstract representation of a scene.

19. The method or apparatus of claim 17, wherein said CID between a pair of groups is calculated as an average CID between point pairs sampled from two groups.

20. The apparatus of claim 15, wherein said seed points are sampled via farthest point sampling based on CID.

* * * * *